United States Patent
Owa

(10) Patent No.: US 12,247,960 B2
(45) Date of Patent: Mar. 11, 2025

(54) SUPERCRITICAL FLUID SEPARATION APPARATUS

(71) Applicant: SHIMADZU CORPORATION, Kyoto (JP)

(72) Inventor: Michiaki Owa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 715 days.

(21) Appl. No.: 16/968,855

(22) PCT Filed: Sep. 13, 2018

(86) PCT No.: PCT/JP2018/033934
§ 371 (c)(1),
(2) Date: Aug. 10, 2020

(87) PCT Pub. No.: WO2019/176143
PCT Pub. Date: Sep. 19, 2019

(65) Prior Publication Data
US 2021/0025856 A1    Jan. 28, 2021

(30) Foreign Application Priority Data
Mar. 14, 2018   (JP) ................................ 2018-046811

(51) Int. Cl.
*B01D 11/02*   (2006.01)
*B01D 11/04*   (2006.01)
(Continued)

(52) U.S. Cl.
CPC ......... *G01N 30/54* (2013.01); *B01D 11/0203* (2013.01); *B01D 11/0207* (2013.01);
(Continued)

(58) Field of Classification Search
CPC ...... B01D 15/161; B01D 15/20; B01D 15/22; B01D 15/40; B01D 11/0203;
(Continued)

(56) References Cited

U.S. PATENT DOCUMENTS 4,984,602 A * 1/1991 Saito ...................... G01N 30/32
                                                            251/129.05
6,666,074 B2 * 12/2003 Gerner ................... G01N 30/30
                                                            73/61.52
(Continued)

FOREIGN PATENT DOCUMENTS

CN        104460751 A     3/2015
JP        2013195392 A    9/2013
(Continued)

OTHER PUBLICATIONS

Machine translation of Owa (JP 2016-114574).*
Office Action for corresponding CN Application No. 201880074415.X dated May 24, 2021, with English language translation.
International Search Report for corresponding Application No. PCT/JP2018/033934, mailed Dec. 11, 2018.
(Continued)

*Primary Examiner* — Benjamin L Lebron
(74) *Attorney, Agent, or Firm* — Renner, Otto, Boisselle & Sklar, LLP

(57) ABSTRACT

A supercritical fluid separation apparatus performs feedback control of output of a heater so that a separation part temperature becomes a set temperature, based on both output of a first temperature sensor that measures a heating block temperature and output of a second temperature sensor that measures the separation part temperature. When a difference between the separation part temperature and the set temperature is large (equal to or more than a predetermined value), output of the heater is adjusted based on the heating block temperature. When a difference between the separation part temperature and the set temperature becomes small (less than a predetermined value), the output of the heater is adjusted based on the difference.

4 Claims, 5 Drawing Sheets

(51) Int. Cl.
  *G01N 30/18* (2006.01)
  *G01N 30/32* (2006.01)
  *G01N 30/54* (2006.01)

(52) U.S. Cl.
  CPC ...... *B01D 11/0403* (2013.01); *B01D 11/0484* (2013.01); *G01N 30/32* (2013.01); *G01N 30/18* (2013.01); *G01N 2030/328* (2013.01)

(58) Field of Classification Search
  CPC ............ B01D 11/0207; B01D 11/0403; B01D 11/0484; G01N 30/30; G01N 30/54; G01N 2030/027; G01N 2030/328; G01N 2030/3007; G01N 2030/3015; G01N 2030/3038; G01N 2030/3046; G01N 2030/3053; G01N 2030/3061; G01N 2030/3069; G01N 2030/3076; G01N 30/32
  See application file for complete search history.

(56) References Cited

U.S. PATENT DOCUMENTS

2015/0157959 A1* 6/2015 Bouvier ................. B01D 15/20
  210/656
2016/0199751 A1* 7/2016 Shreve ................... B01D 15/16
  210/656

FOREIGN PATENT DOCUMENTS

JP 2014160055 A 9/2014
JP 2016114574 A 6/2016

OTHER PUBLICATIONS

Translation of Written Opinion for corresponding Application No. PCT/JP2018/033934, mailed Dec. 11, 2018.

* cited by examiner

SUPERCRITICAL FLUID SEPARATION APPARATUS

TECHNICAL FIELD

The present invention relates to a supercritical fluid separation apparatus that separates a sample component using a supercritical fluid.

BACKGROUND ART

A chromatograph is used to measure an amount of pesticide residues in agricultural products and an amount of metabolites, drugs, and the like in blood. As pretreatment for the measurement, a component to be measured needs to be extracted. In order to extract a component to be measured, an extraction device using a supercritical fluid having a high diffusing power into a sample and exhibiting excellent solubility for many substances has been proposed (see Patent Document 1).

The extraction device of Patent Document 1 has a needle seal structure, in which a plurality of extraction containers are included, and channel connection is performed as both or either one of an inlet portion through which a supercritical fluid is allowed to flow in and an outlet portion through which a supercritical fluid is allowed to flow out in each extraction container receives insertion of a tip of a needle provided in an end portion of a channel to be connected to the inlet portion or the outlet portion, and is configured to automatically switch an extraction container that performs extraction of a sample by automatically moving the needle.

A holder holding the extraction container is thermally conductive, and a temperature of the holder is controlled to a predetermined temperature by using a heater or an element such as a Peltier element. Liquid carbon dioxide and a modifier are supplied to a channel connected to the inlet portion of the extraction container. A back-pressure control valve is provided on a channel connected to the outlet portion of the extraction container.

A mobile phase composed of liquid carbon dioxide and a modifier is delivered in a supercritical state through a channel to the back-pressure control valve as a back-pressure is maintained at a constant high pressure state by the back-pressure control valve. In this manner, the inside of the extraction container is filled with a supercritical fluid, and a component in a sample contained in the extraction container is extracted from the outlet portion of the extraction container. The extracted component is collected in a fractionation device provided on the downstream side, or introduced into a detector after being separated by an analysis column, and analyzed.

PRIOR ART DOCUMENT

Patent Document

Patent Document 1: Japanese Patent Laid-open Publication No. 2014-160055

SUMMARY OF THE INVENTION

Problems to be Solved by the Invention

In an extraction device and a chromatograph using a supercritical fluid, a temperature of an extraction container and an analysis column (which will be collectively referred to as a separation part) is required to be adjusted to a set temperature accurately. Here, as a control method of a heater output for adjusting a temperature of the separation part to the set temperature, feedback control based on a measured value of a heating block temperature and feedback control based on a measured value of a separation part temperature are considered.

In the feedback control based on a measured value of a heating block temperature, output of the heater is adjusted based on a difference between the heating block temperature and the set temperature. Therefore, when the heating block temperature becomes close to the set temperature, the output of the heater is adjusted to be small even though the separation part temperature does not reach a range around the set temperature, and there is a problem that the separation part temperature is less likely to reach the set temperature.

On the other hand, in the feedback control based on a measured value of the temperature of the separation part, the heater may be overheated because an increasing rate of the temperature of the separation part is lower than that of the heating block temperature.

In view of the above, an object of the present invention is to enable the temperature of the separation part to accurately reach the set temperature while overheating of the heater is prevented.

Solutions to the Problems

The supercritical fluid separation apparatus according to the present invention includes a mobile phase delivering channel for delivering a mobile phase, a back-pressure control valve, a separation part, a heating block, a first temperature sensor, a second temperature sensor, a set temperature storage part, and a temperature control part. The back-pressure control valve is connected downstream of the mobile phase delivering channel and controls pressure in the mobile phase delivering channel so that a mobile phase flowing through the mobile phase delivering channel becomes a supercritical state. The separation part is provided between the mobile phase delivering channel and the back-pressure control valve, and separates sample components with a mobile phase delivered from the mobile phase liquid channel. The heating block includes a heater, and is provided so as to be directly or indirectly in contact with the separation part to transfer heat generated by the heater to the separation part. The first temperature sensor is provided so as to measure a temperature of the heating block. The second temperature sensor is provided so as to measure a temperature of the separation part. The set temperature storage part stores a set temperature for the separation part. The temperature control part is configured to feedback-control output of the heater so that a temperature of the separation part becomes the set temperature stored in the set temperature storage part. The temperature control part is configured, when a difference between the set temperature and the temperature of the separation part measured by the second temperature sensor is equal to or more than a predetermined value, to adjust output of the heater based on the temperature of the heating block measured by the first temperature sensor, and is configured, when a difference between the set temperature and the temperature of the separation part measured by the second temperature sensor is less than a predetermined value, to adjust output of the heater based on the difference.

That is, the supercritical fluid separation apparatus according to the present invention performs feedback control of output of the heater so that a separation part temperature becomes a set temperature, based on both output of the first temperature sensor that measures a heating block temperature and output of the second temperature sensor that measures the separation part temperature. Specifically, when a difference between the separation part temperature and the set temperature is large (equal to or more than a predetermined value), output of the heater is adjusted based on the heating block temperature. When a difference between the separation part temperature and the set temperature becomes small (less than a predetermined value), the output of the heater is adjusted based on magnitude of the difference. In this manner, when the separation part temperature is still far from a target temperature, heating of the heater is prevented by performing feedback control based on the heating block temperature. Then, when the separation part temperature becomes closer to the target temperature, feedback control based on the difference between the set temperature and the separation part temperature is performed, and the separation part temperature can be allowed to accurately reach the set temperature.

In the present invention, the temperature control part is preferably configured, when a difference between the set temperature and a temperature of the separation part measured by the second temperature sensor is equal to or more than a predetermined value, to set a target temperature for the heating block to a temperature higher than the set temperature, and adjust output of the heater based on a difference between the target temperature and the temperature of the heating block measured by the first temperature sensor. In this manner, when the separation part temperature is far from the set temperature, the target temperature of the heating block is set to be higher than the set temperature, so that the output of the heater is adjusted to be high and the separation part temperature can be increased promptly.

In the present invention, the separation part may be an extraction container including an internal space for containing a sample, an inlet portion to which the mobile phase delivering channel is connected so that a mobile phase from the mobile phase delivering channel is introduced into the internal space through the inlet portion, and an outlet portion to which a channel communicating with the back-pressure control valve is connected so that an extracted sample flows out to the back-pressure control valve side together with a mobile phase from the internal space through the outlet portion.

Note that the "separation part" in the present invention includes, besides the above-mentioned extraction container, an analysis column that separates a sample into components by allowing a supercritical fluid to pass through.

In a case where the separation part is an extraction container, at least one of the inlet portion and the outlet portion of the extraction container may have a needle seal structure configured so that a channel to be connected to the inlet portion or the outlet portion is connected to the internal space by being inserted a movable needle provided at an end portion of a channel to be connected to the inlet portion or the outlet portion. In this case, the supercritical fluid separation apparatus further includes a needle moving mechanism configured to perform connecting and disconnecting of the channel to/from the inlet portion or the outlet portion by moving the needle provided at the end portion of a channel to be connected to the inlet portion or the outlet portion of the extraction container. The second temperature sensor may be held by the needle moving mechanism so as to be in contact with an outer surface of the extraction container when the needle is inserted into the inlet portion or the outlet portion of the extraction container. With this configuration, pipe connection to the inlet portion or the outlet portion of the extraction container is automatically and easily performed. Accordingly, work such as cleaning and replacement of the extraction container is facilitated, and the second temperature sensor that measures a temperature of the extraction container does not need to be provided for each extraction container.

Effects of the Invention

In the supercritical fluid separation apparatus according to the present invention, when a difference between the separation part temperature and the set temperature is large, output of the heater is adjusted based on the heating block temperature, and, when a difference between the separation part temperature and the set temperature becomes small, output of the heater is controlled based on magnitude of the difference. Accordingly, the separation part temperature can be allowed to accurately reach the set temperature while heating of the heater is prevented.

EMBODIMENT OF THE INVENTION

Hereinafter, an embodiment of a supercritical fluid separation apparatus will be described with reference to the drawings.

Figure 1:
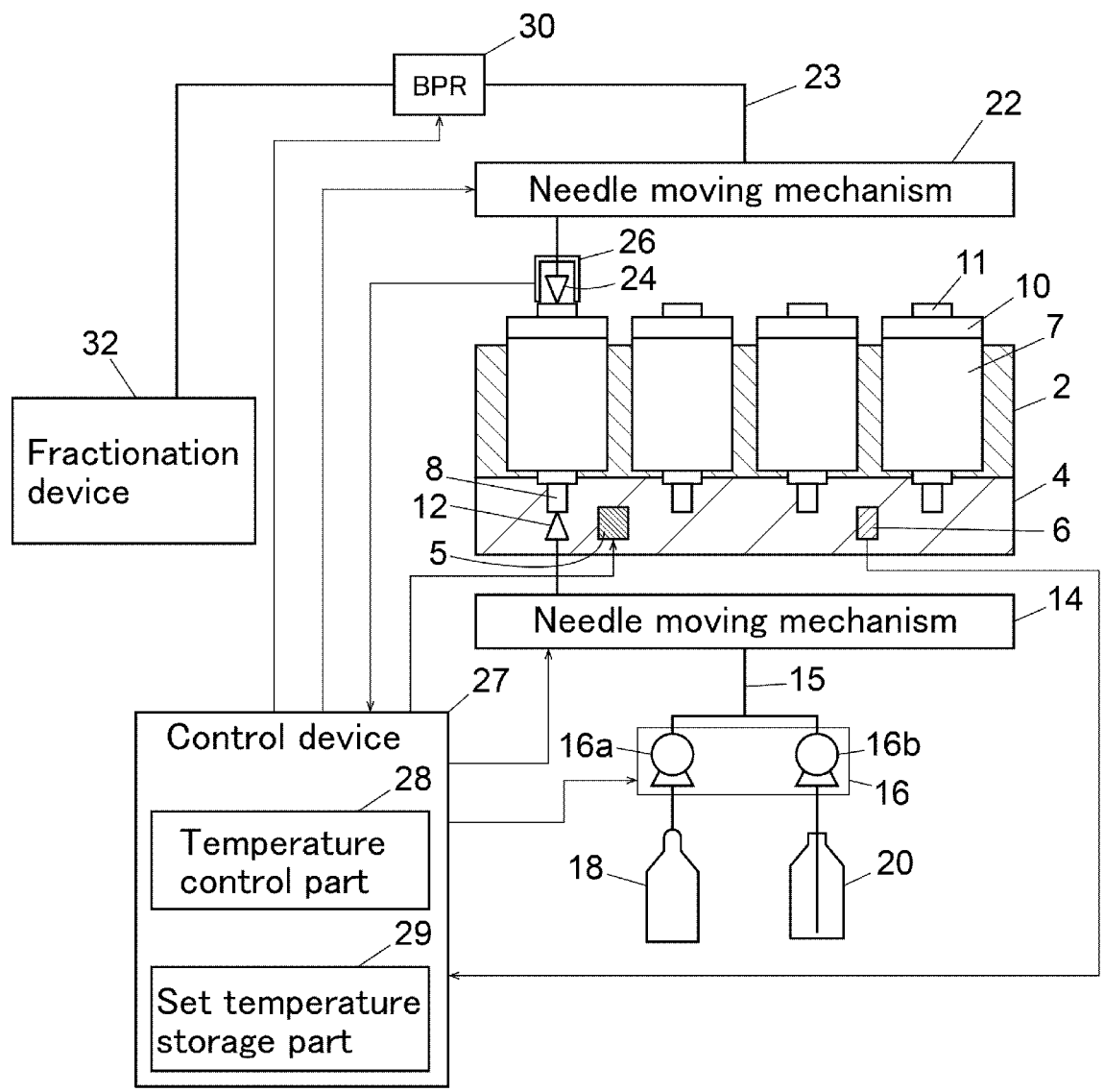
FIG. 1 is a schematic configuration cross-sectional view showing one embodiment of a supercritical fluid separation apparatus.

As shown in FIG. 1, an extraction container 7 serving as a separation part containing a sample from which a component is to be extracted is contained in a container holder 2. In the present embodiment, four of the extraction containers 7 are provided. However, the number of the extraction containers 7 may be three or less or five or more. The extraction container 7 is made from metal having an excellent thermal conductivity.

The container holder 2 has a hole for containing a lower portion than a cap portion 10 in an upper portion of the extraction container 7. The container holder 2 is made from metal having an excellent thermal conductivity, and a heating block 4 is provided below the container holder 2. The heating block 4 is a heat conductive metal member in which a first temperature sensor 6 including a heater 5 and a thermistor is embedded. The output of the heater 5 embedded in the heating block 4 is controlled by a control device 27 described later based on a temperature $T_1$ of the heating block 4 (hereinafter, the heating block temperature $T_1$) measured by a first temperature sensor 6 and a temperature $T_2$ of the extraction container 7 (hereinafter, the extraction container temperature $T_2$) measured by a second temperature sensor 2 described later, so that the temperature of the extraction container 7 becomes a set temperature.

The cap portion 10 is detachably mounted on the upper portion of the extraction container 7. By removing the cap portion 10, a sample can be contained in the extraction container 7, and a contained sample can be taken out. An outlet portion 11 is provided on an upper surface side of the cap portion 10. An inlet portion 8 is provided on a lower surface side of the extraction container 7.

The inlet portion 8 and the outlet portion 11 have a needle seal structure in which channel connection is performed by inserting a needle. The needle seal structure will be described later.

Above a sample holder 2, an inlet needle 12 having a tip portion directed in a vertically upward direction, and a needle moving mechanism 14 for moving the inlet needle 12 in a horizontal in-plane direction and a vertical direction are provided. A mobile phase delivering channel 15 is connected to a base end portion of the inlet needle 12. A liquid delivery device 16 is connected to the mobile phase delivering channel 15. The liquid delivery device 16 includes a liquid delivery pump 16a for delivering liquid carbon dioxide from a carbon dioxide container 18 and a liquid delivery pump 16b for delivering a modifier from a modifier container 20. A mixed solution of carbon dioxide and a modifier is supplied to a tip of the inlet needle 12 by the liquid delivery device 16.

The inlet needle 12 is inserted into the inlet portion 8 of the extraction container 7 and connects the mobile phase delivering channel 15 to internal space of the extraction container 7. Although not shown, the heating block 4 of the sample holder 2 is provided with a hole communicating with the inlet portion 8 of the extraction container 7 contained in the sample holder 2, and the inlet needle 12 is inserted from the hole into the inlet portion 8.

Above the sample holder 2, an outlet needle 24 having a tip portion directed in a vertically downward direction, and a needle moving mechanism 22 for moving the outlet needle 24 in a horizontal in-plane direction and a vertical direction are provided. An extraction channel 23 is connected to a base end portion of the outlet needle 24. The extraction channel 23 communicates with a fractionation device 32, and a back-pressure control valve (BPR) 30 is provided on the extraction channel 23.

The outlet needle 24 is inserted into the outlet portion 11 of the extraction container 7 and connects the extraction channel 23 to internal space of the extraction container 7. A sensor holder 26 is provided on the outlet needle 24, and a second temperature sensor 36 (see FIG. 2) is provided at a lower end of the sensor holder 26. The second temperature sensor 36 is in contact with an outer surface of the extraction container 7 when the outlet needle 24 is inserted into the outlet portion 11 of the extraction container 7, and measures the temperature of the outer surface of the extraction container 7.

In this supercritical fluid separation apparatus, the inlet needle 12 and the outlet needle 24 are respectively inserted into the inlet portion 8 and the outlet portion 11 of the extraction container 7 containing a sample from which a component is to be extracted, and the liquid delivery 16 is driven so that a mobile phase composed of liquid carbon dioxide and a modifier is supplied to the extraction container 7. At this time, the back-pressure control valve 30 controls the pressure in the system constituted by the mobile phase delivering channel 15, the extraction container 7, and the extraction channel 23 upstream of the back-pressure control valve 30 to be at a pressure at which a mobile phase is in a supercritical state.

A component is extracted from the sample contained in the extraction container 7 as the extraction container 7 is filled with a supercritical fluid, and the component is introduced into the fractionation device 32 through the extraction channel 23 together with a mobile phase and collected.

Figure 2:
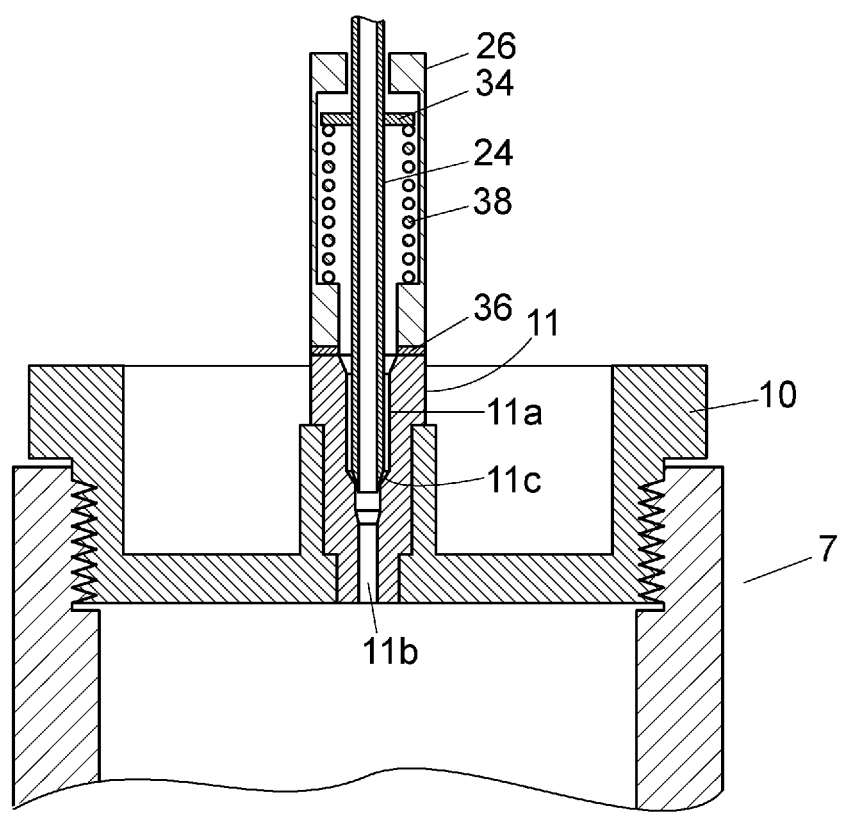
FIG. 2 is a cross-sectional view showing a needle seal structure at an outlet portion of an extraction container in the example.

Here, the needle seal structure at the outlet portion of the extraction container 7 and a structure of the sensor holder 26 will be described with reference to FIG. 2. The inlet portion 8 of the extraction container 7 also has a needle seal structure, which is the same as the needle seal structure of the outlet portion 11.

The outlet portion 11 of the extraction container 7 is provided in a cap portion 10 mounted on an upper portion of the extraction container 7. A screw in the circumferential direction is provided in an upper portion of an inner surface of a main body portion of the extraction container 7, and a screw is also provided in a lower portion of an outer peripheral surface of the cap portion 10. By rotating the cap portion 10 relatively to the main body portion of the extraction container 7, the cap portion 10 can be tightened and fixed to the main body portion, or the cap portion 10 can be loosened and removed from the main body portion.

The outlet portion 11 is provided with a hole 11a into which a tip portion of the outlet needle 24 is inserted, and a hole 11b that allows the hole 11a to communicate with internal space of the extraction container 7. An inner diameter of the hole 11a is larger than an outer diameter of the outlet needle 24, and an inner diameter of the hole 11b is smaller than an outer diameter of the outlet needle 24. A joint portion 11c between the hole 11a and the hole 11b has a tapered shape in which an inner diameter is smaller in a lower portion, and a tip portion of the outlet needle 24 is pressed against the joint portion 11c, so that an inner channel of the outlet needle 24 is connected to the hole 11b while the sealing property is maintained.

The sensor holder 26 is attached to a tip side of the outlet needle 24. The sensor holder 26 is a cylindrical member that surrounds an outer peripheral surface of the outlet needle 24, and has a lower end surface provided with the second temperature sensor 36 including, for example, a thermistor. An elastic member 38 such as a coil spring, which expands and contracts in an axial direction of the outlet needle 24, is contained on an inner side of the sensor holder 26. The elastic member 38 has an upper end engaged with a flange-shaped protrusion 34 provided on the outlet needle 24, and a lower end engaged with the sensor holder 26. The sensor holder 26 is energized by the elastic member 38 toward a tip side of the outlet needle 24.

The second temperature sensor 36 provided on a lower end surface of the sensor holder 26 is in contact with an edge of the hole 11a of the outlet portion 11 when the outlet needle 24 is inserted into the hole 11a of the outlet portion 11, is pressed against the edge of the hole 11a by an elastic force of the elastic member 38 to be in close contact with the edge, and measures the temperature $T_2$ of the cap portion 10 of the extraction container 7 (extraction container temperature $T_2$).

Returning to FIG. 1, the control device 27 that controls the output of the heater 5 embedded in the heating block 4, operation of the needle moving mechanisms 14 and 22, operation of the liquid delivery device 16, and operation of the back-pressure control valve 30 is provided. The control device 27 is realized by a dedicated computer or a general-purpose personal computer.

The control device 27 includes a temperature control part 28 and a set temperature storage part 29 as a function for performing temperature control of the extraction container 7. The temperature control part 28 is a function obtained by an arithmetic element such as a microcomputer executing a predetermined program in the control device 27, and the set temperature storage part 29 is a function realized by part of a storage region of a storage device provided in the control device 27.

A target temperature of the extraction container 7 is set by the user, and the set temperature Ts is stored in the set temperature storage part 29. The temperature control part 28 is configured to perform feedback control of output of the heater 5 based on the heating block temperature $T_1$ measured by the first temperature sensor 6 and the extraction container temperature $T_2$ measured by the second temperature sensor 36 (see FIG. 2), so that the temperature of the extraction container 7 becomes the set temperature Ts stored in the set temperature storage part 29.

Specifically, when a difference (Ts–$T_2$) between the extraction container temperature $T_2$ and the set temperature Ts is equal to or more than a predetermined value a, that is, the extraction container temperature $T_2$ is equal to or lower than a threshold value (Ts–a) which is lower than the set temperature Ts by the predetermined value a (a>0), the temperature control part 28 adjusts the output of the heater 5 based on the heating block temperature $T_1$. Then, when the difference (Ts–$T_2$) between the extraction container temperature $T_2$ and the set temperature Ts is less than the predetermined value a, that is, the extraction container temperature $T_2$ exceeds the threshold value (Ts–a) which is lower than the set temperature Ts by the predetermined value a, the temperature control part 28 adjusts the output of the heater 5 based on the difference (Ts–$T_2$) between the set temperature Ts and the extraction container temperature $T_2$. Note that a may be a value that is variably adjusted according to the set temperature Ts.

Furthermore, in the present embodiment, when the difference (Ts–$T_2$) between the extraction container temperature $T_2$ and the set temperature Ts is equal to or more than the predetermined value a, that is, the extraction container temperature $T_2$ is equal to or lower than the temperature (Ts–a) that is lower than the set temperature Ts by a predetermined value a, the temperature control part 28 sets a target temperature of the heating block 4 to a temperature (Ts+α) higher than the set temperature by a predetermined value α (α>0), and adjusts the output of the heater 5 based on a difference (Ts+α–$T_1$) between the heating block temperature $T_1$ and the target temperature (Ts+α). In this manner, a temperature increase rate of the extraction container 7 until the extraction container temperature $T_2$ reaches the threshold value (Ts–a) is improved as compared with a case where the output of the heater 5 is adjusted based on a difference between the heating block temperature $T_1$ and the set temperature Ts. Note that α may be a value variably adjusted according to the set temperature Ts.

Figure 3:
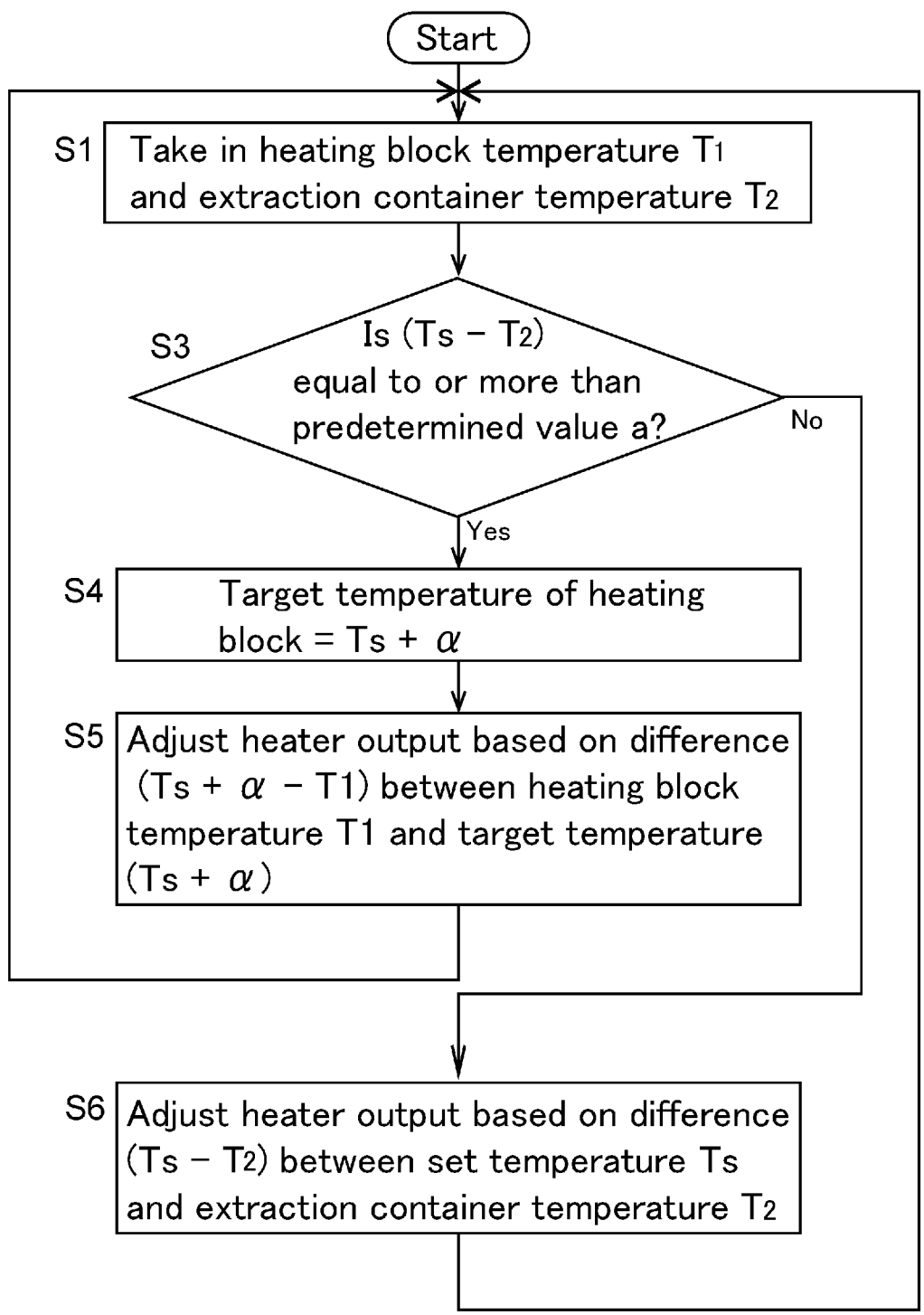
FIG. 3 is a flowchart for explaining temperature control operation in the embodiment.

Temperature control operation of the extraction container 7 realized by the temperature control part 28 will be described with reference to a flowchart of FIG. 3.

The control device 27 takes in, at regular time intervals, the heating block temperature $T_1$ and the extraction container temperature $T_2$ measured by the first temperature sensor 6 and the second temperature sensor 36 (Step S1). When the difference (Ts–$T_2$) between the extraction container temperature $T_2$ taken in by the control device 27 and the set temperature Ts is equal to or more than the predetermined value a (Step S3), the temperature control part 28 sets the target temperature of the heating block 4 to the temperature (Ts+α) higher than the set temperature Ts (Step S4), and adjusts the output of the heater 5 based on the difference (Ts+α–$T_1$) between the target temperature (Ts+α) and the heating block temperature $T_1$ (Step S5). On the other hand, when the difference (Ts–$T_2$) between the extraction container temperature $T_2$ taken into the control device 27 and the set temperature Ts is less than the predetermined value a (Step S3), the output of the heater 5 is adjusted based on the difference (Ts–$T_2$) (Step S6).

Figure 4:
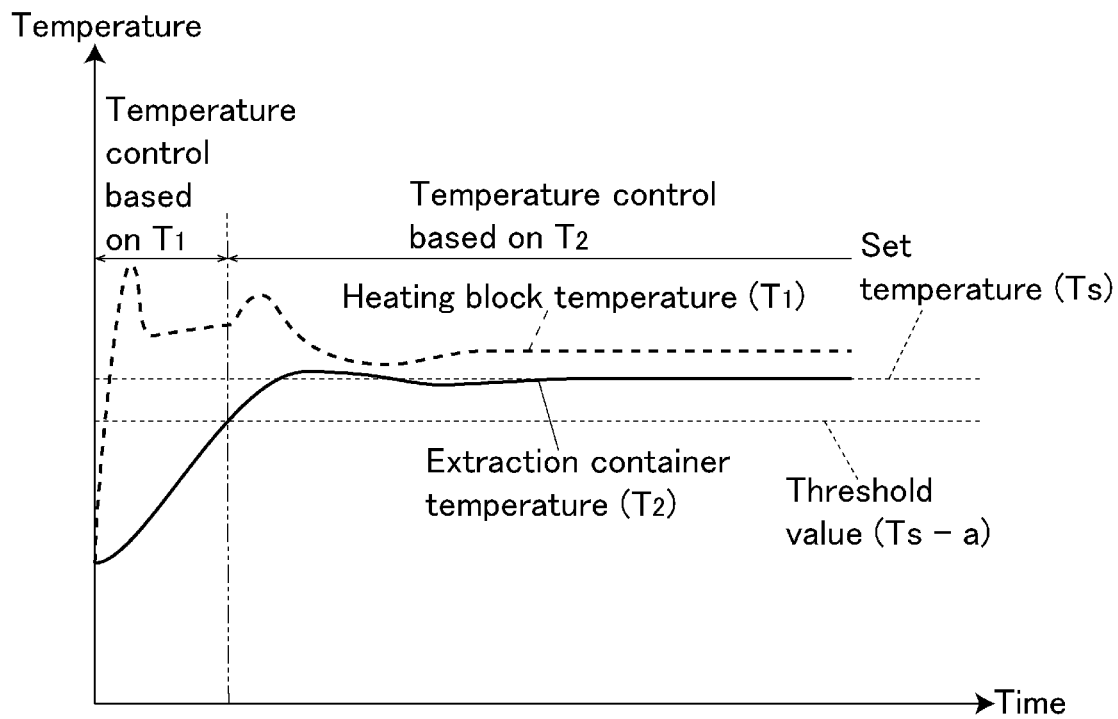
FIG. 4 is a diagram showing an example of a temporal change of a heating block temperature and an extraction container temperature in the embodiment.

FIG. 4 shows an example of a temporal change of the heating block temperature $T_1$ and the extraction container temperature $T_2$ realized by the above control method. As shown in the diagram, until the extraction container temperature $T_2$ reaches the threshold value (Ts–a), the output of the heater 5 is adjusted so that the heating block temperature $T_1$ becomes closer to the target temperature (Ts+α) higher than the set temperature Ts. Accordingly, the extraction container temperature $T_2$ quickly reaches the threshold value (Ts–a) without an excessive increase in the temperature of the heating block 4. Then, after the extraction container temperature $T_2$ reaches the threshold value (Ts–a), the output of the heater 5 is adjusted so that the extraction container temperature $T_2$ becomes closer to the set temperature Ts. Accordingly, the extraction container temperature $T_2$ can be controlled to the set temperature Ts accurately.

Figure 5:
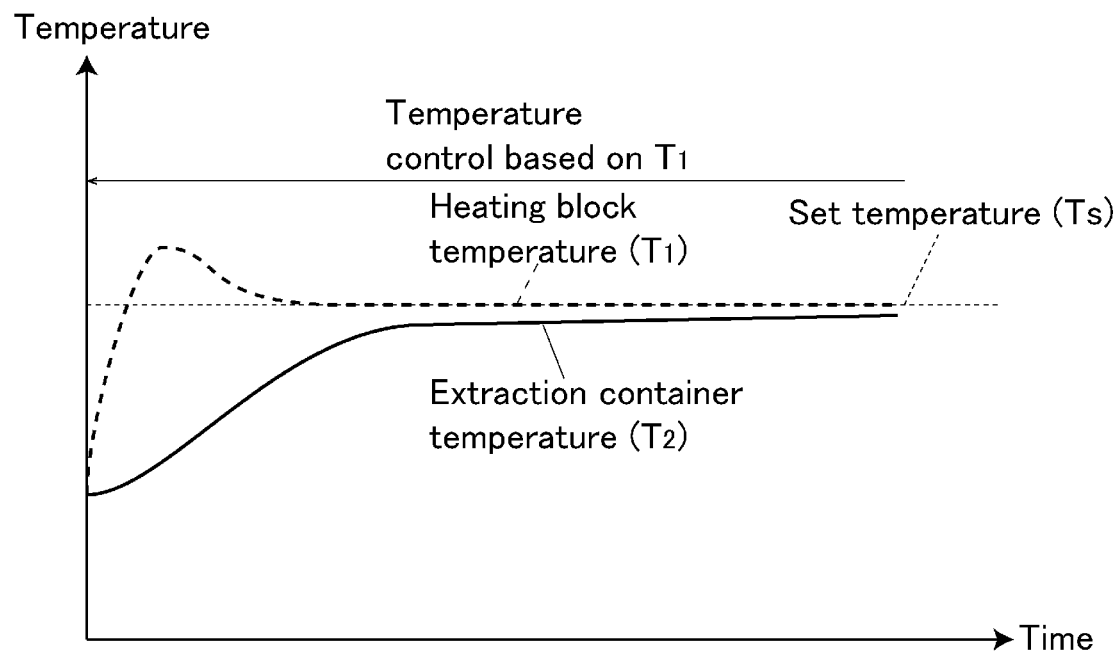
FIG. 5 is a diagram showing an example of a temporal change of the heating block temperature and the extraction container temperature in a case where feedback control is performed based only on the heating block temperature.
Figure 6:
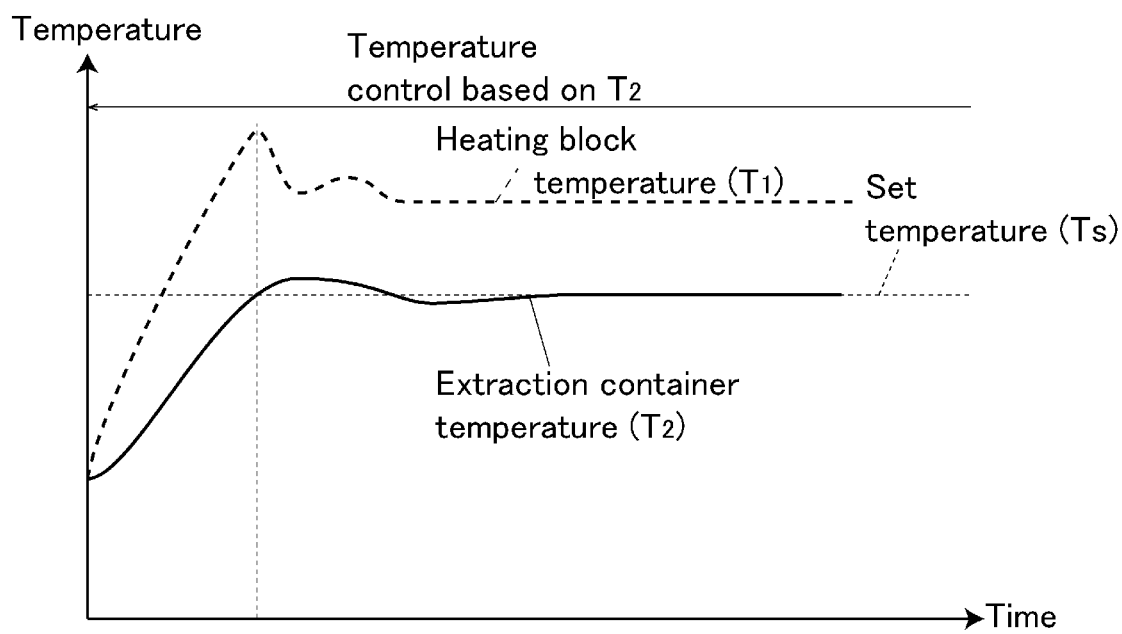
FIG. 6 is a diagram showing an example of a temporal change of the heating block temperature and the extraction container temperature in a case where feedback control is performed based only on the extraction container temperature.

FIG. 5 shows an example of a temporal change of the heating block temperature $T_1$ and the extraction container temperature $T_2$ in a case where the feedback control of the output of the heater 5 is performed based only on the heating block temperature $T_1$. FIG. 6 shows an example of a temporal change of the heating block temperature $T_1$ and the extraction container temperature $T_2$ in a case where the feedback control of the output of the heater 5 is performed based only on the extraction container temperature $T_2$.

As can be seen from FIG. 5, when the feedback control of the output of the heater 5 is performed based only on the heating block temperature $T_1$, the output of the heater 5 is adjusted so that the temperature of the heating block $T_1$ is maintained to be constant when the heating block temperature $T_1$ reaches the set temperature Ts. Accordingly, there is a problem that the extraction container temperature $T_2$ is less likely to reach the set temperature Ts.

On the other hand, as can be seen from FIG. 6, when the feedback control of the output of the heater 5 is performed based only on the extraction container temperature $T_2$, the heating block 4 is continuously heated by the heater 5 until the extraction container temperature $T_2$ reaches the set temperature Ts. Accordingly, there is a problem that the heating block temperature $T_1$ excessively increases.

On the other hand, as in the present embodiment, the feedback control based on the heating block temperature $T_1$ and the feedback control based on the extraction container temperature $T_2$ are switched during the feedback control and executed. In this manner, the extraction container temperature $T_1$ can be accurately controlled to be at the set temperature Ts while the overheating by the heater 5 is prevented.

Note that, although detailed description is omitted, the above-described temperature control operation can be similarly applied to a supercritical fluid chromatograph provided with an analysis column as a separation part.

DESCRIPTION OF REFERENCE SIGNS

2: Container holder
4: Heating block

5: Heater
6: First temperature sensor
7: Extraction container
8: Inlet portion
10: Cap portion
11: Outlet portion
12: Inlet needle
14, 22: Needle moving mechanism
15: Mobile phase delivering channel
16: Liquid delivery device
16a, 16b: Liquid delivery pump
18: Carbon dioxide container
20: Modifier container
23: Extraction channel
24: Outlet needle
26: Sensor holder
27: Control device
28: Temperature control part
29: Set temperature storage part
30: Back-pressure control valve
32: Fractionation device
34: Protrusion
36: Second temperature sensor
38: Elastic member

The invention claimed is:

1. A supercritical fluid separation apparatus, comprising:
a mobile phase delivering channel for delivering a mobile phase;
a back-pressure control valve that is connected downstream of the mobile phase delivering channel and controls pressure in the mobile phase delivering channel so that a mobile phase flowing through the mobile phase delivering channel becomes a supercritical state;
a separation part that is provided between the mobile phase delivering channel and the back-pressure control valve, and separates sample components with a mobile phase delivered from the mobile phase liquid channel;
a heating block that includes a heater, and is provided so as to be directly or indirectly in contact with the separation part to transfer heat generated by the heater to the separation part;
a first temperature sensor provided so as to measure a temperature of the heating block;
a second temperature sensor provided so as to measure a temperature of the separation part;
a set temperature storage part that stores a set temperature for the separation part; and
a temperature control part configured to feedback-control an output of the heater so that a temperature of the separation part becomes the set temperature stored in the set temperature storage part,
wherein the temperature control part is configured to determine whether or not a difference between the set temperature and the temperature of the separation part measured by the second temperature sensor is equal to or more than a predetermined value which is more than zero,
wherein the temperature control part is configured, in a case where the difference is equal to or more than the predetermined value, to adjust output of the heater based on the temperature of the heating block measured by the first temperature sensor, and
wherein the temperature control part is configured, in a case where the difference is less than the predetermined value, to adjust output of the heater based on the difference.

2. The supercritical fluid separation apparatus according to claim 1, wherein the temperature control part is configured, when the difference between the set temperature and the temperature of the separation part measured by the second temperature sensor is equal to or more than the predetermined value, to set a target temperature for the heating block to a temperature higher than the set temperature, and adjust output of the heater based on a difference between the target temperature and the temperature of the heating block measured by the first temperature sensor.

3. The supercritical fluid separation apparatus according to claim 1, wherein the separation part is an extraction container including an internal space for containing a sample, an inlet portion to which the mobile phase delivering channel is connected so that a mobile phase from the mobile phase delivering channel is introduced into the internal space through the inlet portion, and an outlet portion to which a channel communicating with the back-pressure control valve is connected so that an extracted sample flows out to the back-pressure control valve side together with a mobile phase from the internal space through the outlet portion.

4. The supercritical fluid separation apparatus according to claim 3, wherein at least one of the inlet portion and the outlet portion of the extraction container has a needle seal structure configured so that a channel to be connected to the inlet portion or the outlet portion is connected to the internal space by being inserted a movable needle provided at an end portion of the channel to be connected to the inlet portion or the outlet portion,
the supercritical fluid separation apparatus further comprising a needle moving mechanism configured to perform connecting and disconnecting of the channel to/from the inlet portion or the outlet portion by moving the needle provided at the end portion of the channel to be connected to the inlet portion or the outlet portion of the extraction container, wherein
the second temperature sensor is held by the needle moving mechanism so as to be in contact with an outer surface of the extraction container when the needle is inserted into the inlet portion or the outlet portion of the extraction container.

* * * * *